(12) United States Patent
Wooldridge et al.

(10) Patent No.: US 11,651,440 B2
(45) Date of Patent: *May 16, 2023

(54) METHOD FOR OFFERING A PROTECTION POLICY FOR A MOBILE DEVICE

(71) Applicant: Asurion, LLC, Nashville, TN (US)

(72) Inventors: Carl Alexander Wooldridge, Spring Hill, TN (US); Brian Townsend Johnson, Leesburg, VA (US); Francis M. Anton, Jr., San Jose, CA (US); Jeffrey Hunter Pittman, Murfreesboro, TN (US)

(73) Assignee: Asurion, LLC, Nashville, TN (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/107,522

(22) Filed: Nov. 30, 2020

(65) Prior Publication Data
US 2021/0182974 A1    Jun. 17, 2021

Related U.S. Application Data

(63) Continuation of application No. 15/957,262, filed on Apr. 19, 2018, now Pat. No. 10,853,885, which is a (Continued)

(51) Int. Cl.
*G06Q 40/08* (2012.01)
*G06F 17/00* (2019.01)
(Continued)

(52) U.S. Cl.
CPC .......... *G06Q 40/08* (2013.01); *G06F 17/00* (2013.01); *G06Q 10/10* (2013.01); *G06Q 50/22* (2013.01); *H04M 1/24* (2013.01); *G06Q 30/02* (2013.01)

(58) Field of Classification Search
CPC ........ G06Q 40/04; G06Q 10/10; G06Q 50/22; G06Q 30/02; G06F 17/00; H04M 1/24
(Continued)

(56) References Cited

U.S. PATENT DOCUMENTS

| 7,386,463 | B2* | 6/2008 | McCabe | G06Q 40/08 |
| | | | | 705/405 |
| 7,974,861 | B1* | 7/2011 | Bohanek | G06Q 40/08 |
| | | | | 707/634 |

(Continued)

OTHER PUBLICATIONS

Customer expectations of remote maintenance services in the medical equipment industry. Journal of Service Management ψ Oct. 2014 (Year: 2014).*

(Continued)

*Primary Examiner* — Bruce I Ebersman
*Assistant Examiner* — John O Preston
(74) *Attorney, Agent, or Firm* — Fish & Richardson P.C.

(57) ABSTRACT

One embodiment includes a method for offering a protection policy for a mobile device, the method comprising the steps of providing an application, conducting a test of the mobile device, calculating the risk of protecting the mobile device, and offering an protection policy. The application is configured to operate on the mobile device and to test at least one function of the mobile device. The test is conducted by the application and verifies at least one function of the mobile device through the application. The risk of protecting the mobile device is based upon at least one result of the test. The protection policy for the mobile device is based upon the calculated risk, has a cost, and is offered for purchase to a user of the mobile device.

14 Claims, 2 Drawing Sheets

Related U.S. Application Data continuation of application No. 14/157,462, filed on Jan. 16, 2014, now Pat. No. 9,984,416, which is a continuation of application No. 13/152,141, filed on Jun. 2, 2011, now Pat. No. 8,635,092.

(60) Provisional application No. 61/350,837, filed on Jun. 2, 2010.

(51) Int. Cl.
| | | |
|---|---|---|
| *G06Q 10/10* | (2012.01) | |
| *H04M 1/24* | (2006.01) | |
| *G06Q 50/22* | (2018.01) | |
| *G06Q 30/02* | (2012.01) | |

(58) Field of Classification Search
USPC .................................................. 705/4
See application file for complete search history.

(56) References Cited

U.S. PATENT DOCUMENTS

| | | | |
|---|---|---|---|
| 8,230,497 | B2 | 7/2012 | Norman et al. |
| 8,635,092 | B2 | 1/2014 | Wooldridge et al. |
| 9,984,416 | B2 | 5/2018 | Wooldridge et al. |
| 10,583,885 | B2 * | 3/2020 | Raffaelli ............... B62K 5/01 |
| 2006/0282660 | A1 * | 12/2006 | Varghese ............. G07F 7/1083 |
| | | | 713/155 |
| 2007/0288270 | A1 * | 12/2007 | Gay ...................... G06Q 40/08 |
| | | | 705/4 |
| 2008/0127313 | A1 | 5/2008 | Payne et al. |
| 2008/0312968 | A1 | 12/2008 | Hannon et al. |
| 2009/0247122 | A1 * | 10/2009 | Fitzgerald .............. G06F 21/88 |
| | | | 455/410 |
| 2009/0325615 | A1 * | 12/2009 | McKay .................. H04W 4/14 |
| | | | 455/466 |
| 2010/0064379 | A1 * | 3/2010 | Cassett ............... H04W 12/082 |
| | | | 726/34 |
| 2012/0029947 | A1 | 2/2012 | Wooldridge et al. |
| 2014/0136245 | A1 | 5/2014 | Wooldridge et al. |
| 2018/0308175 | A1 | 10/2018 | Wooldridge et al. |

OTHER PUBLICATIONS

Smartphone Instrumentation for Insurance Telematics. 2015 IEEE International Instrumentation and Measurement Technology Conference (I2MTC) Proceedings (Year: 2015).*

Driving Behavior Analysis for Smartphone-based Insurance Telematics. Proceedings of the 2nd workshop on Workshop on Physical Analytics. May 2015 pp. 19-24 (Year: 2015).*

Focus on the adults of generation Y in the US: hitting the demographic, lifestyle, and marketing mark. Business Wire. Dec. 2, 2008.

Research and markets: wireless retail survey—what's really happening at the point of sale? M2 Presswire. Jun. 25, 2003.

Thomson Healthcare: new reports from Thomson Healthcare detailed. Pharma Business Week, Jul. 30, 2007.

Händel et al., "Smartphone Instrumentation for Insurance Telematics," 2015 IEEE International Instrumentation and Measurement Technology Conference (I2MTC) Proceedings (Year: 2015).

Stefanie Paluch (2014), "Customer Expectations of Remote Maintenance Services in the Medical Equipment Industry," Journal of Service Management, vol. 25 Iss 5 pp. 639-653, permanent link to this document: http://dx.doi.org/10._1_1_08/JOSM-07-201_3-01_95.

Wahlström et al., "Driving Behavior Analysis for Smartphone-based Insurance Telematics," Proceedings of the 2nd workshop on Workshop on Physical Analytics, May 2015, pp. 19-24 (Year: 2015).

* cited by examiner

METHOD FOR OFFERING A PROTECTION POLICY FOR A MOBILE DEVICE

CROSS-REFERENCE TO RELATED APPLICATIONS

This disclosure is a continuation of and claims priority to U.S. application Ser. No. 15/957,262, filed on Apr. 19, 2018, which is a continuation of U.S. application Ser. No. 14/157,462, filed on Jan. 16, 2014 (now U.S. Pat. No. 9,984,416), which is a continuation of U.S. application Ser. No. 13/152,141, filed on Jun. 2, 2011 (now U.S. Pat. No. 8,635,092), which is a non-provisional of and claims the benefit of U.S. Provisional Application No. 61/350,837 filed on Jun. 2, 2010. The disclosures of the prior applications are hereby incorporated by reference in their entirety.

TECHNICAL FIELD

This invention relates generally to the insurance field, and more specifically to a new and useful method for offering an insurance policy for a mobile device in the insurance field.

BACKGROUND

Mobile devices such as smart phones, tablet computers, electronic book readers, and other devices have seen an increase in usage in recent years. Such devices in some cases have begun to displace the use of the desktop computer. Mobile devices see much more frequent use throughout the day, which results in "wear and tear" damage to the mobile devices. Additionally, mobile devices are much more susceptible to being damaged, stolen, or lost. With so much value invested in mobile devices and with the risk of losing or breaking the mobile devices being sufficiently high, there are many benefits to having a protection policy, such as an insurance policy, warranty plan, or some other suitable program, for the mobile device. However, it is difficult for companies to assess the risk they take on when protecting or insuring such devices. The state of the mobile device when entering an insurance program is generally unknown. Even if visually inspected by an employee, there are numerous components that are not easily tested. Many warranties and insurance options are only available at the time of first sale because of the known state of the phone at that time. Thus, there is a need in the insurance field to create a new and useful method for offering an insurance policy for a mobile device, wherein the insurance policy is based upon a calculated risk of insuring the mobile device and not necessarily based upon the date of sale of the mobile device. This invention provides such a new and useful method.

Protection policies, such as warranties and insurance policies, for mobile devices currently exist, but registration of a warranty or insurance policy for a mobile device must be initiated within a substantially short period of time following the sale of the mobile device. Furthermore, if a mobile device covered by a warranty or insurance policy is damaged, the device must be taken to a customer service center so the damage can be verified. This may present an inconvenience to the owner and/or user of the mobile device and may be further disruptive to the owner and/or user if: the damage is shown to not be covered under the warranty or insurance policy; the device is shown not to be damaged but instead inhibited by a configuration of the mobile device (such as an "Airplane Mode" setting); or the owner and/or user must wait in a line before a customer service representative will verify the damage of the mobile device. Thus there is a need in the insurance field to create a new and useful method for verifying a claim on a protection policy for a mobile device. This invention also provides such a new and useful method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
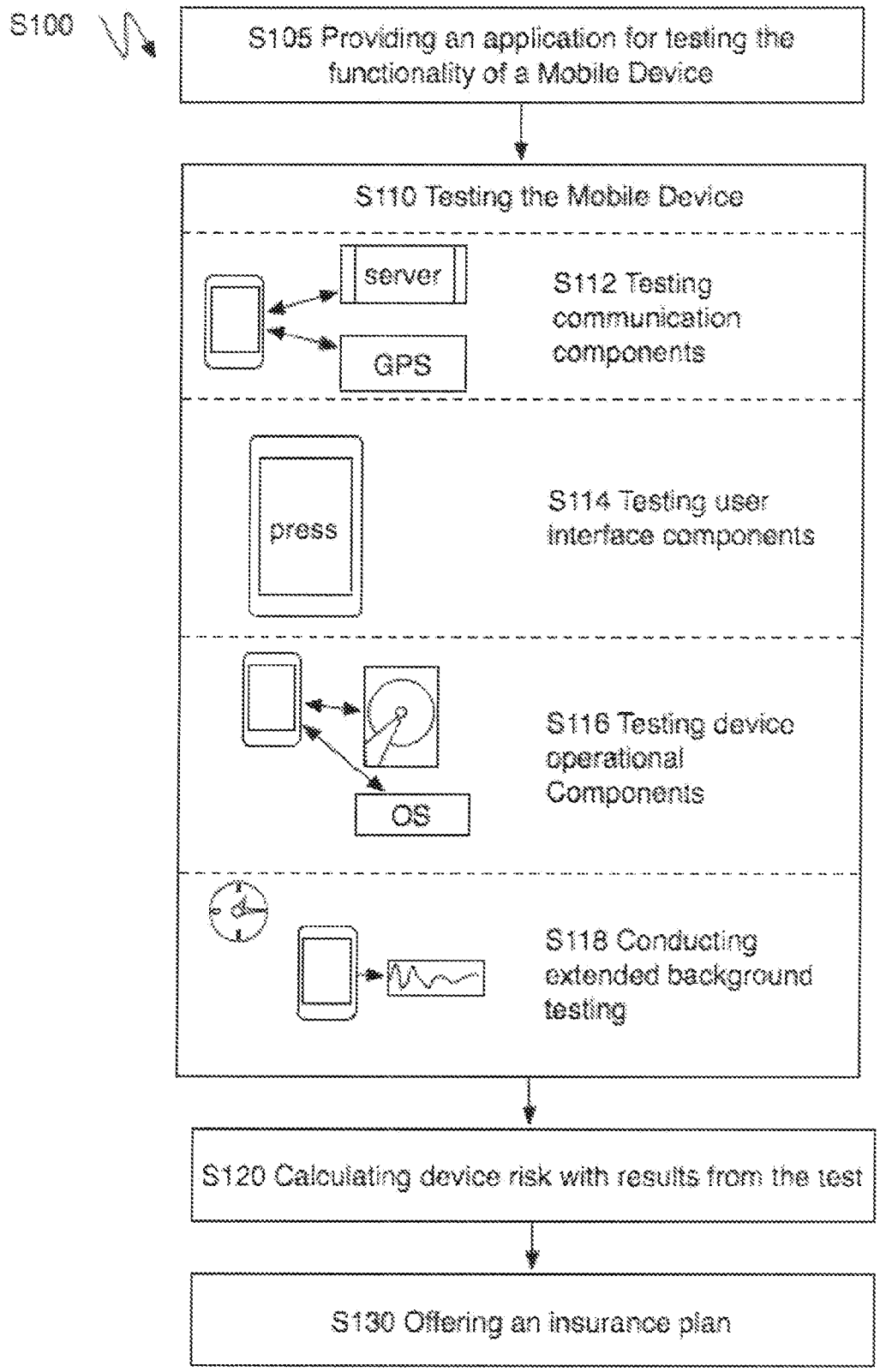
FIG. 1 is a flowchart representation of a method of a first preferred embodiment of the invention.

As shown in FIG. 1, a method of a first preferred embodiment for offering a protection policy for a mobile device preferably includes: providing an application for testing the mobile device S105; testing a mobile device Silo; calculating device risk with results from the test S120; and offering a protection policy S130. The method functions to evaluate the operational state of the mobile device and facilitate enrollment in an appropriate program. The method is preferably for smart phones but may alternatively be for mobile phones, personal data assistants (PDA), netbooks, tablet computers, electronic book readers, home entertainment devices, gaming devices, or any other suitable computing device. The method of the first preferred embodiment is preferably designed for offering an insurance policy for a mobile device, but may alternatively be for a warranty, product registration, used-product pricing, and/or any suitable mobile device evaluation.

Step S105, which includes providing an application for testing a mobile device, functions to provide a platform upon which to test various functions of the mobile device. Preferably, the application is made available to the owner and/or user of the mobile device through the internet or through an applications store. For example, the owner and/or user may download the application from an iTunes Store or through an App (application) Store application already installed on the mobile device. Furthermore, the owner and/or user may download the application onto a separate device and then transfer it to the mobile device, or the application may be installed on the mobile device before the mobile device is sold to the owner and/or user. Preferably, the application is a native application, but the application may alternatively be a web application or any suitable application configured to run on the mobile device. However, the application may be provided to the owner and/or user and installed on the mobile device via any other method or methods. The application is preferably configured to operate on the mobile device such that the application initiates the testing of at least one function of the mobile device; the application may begin testing once accessed by the mobile device, or the application may begin testing when prompted to do so by the user of the mobile device. The application may test one or more functions directly, such as by sending a SMS message directly through the application to a remote server to test a cellular antenna arranged substantially within the mobile device. Alternatively, the application may command one or more external applications to test a certain function, such as by (1) prompting a Maps application operating on the mobile device to determine the location of the mobile device through GPS, and (2) prompting a Phone application operating on the mobile device to determine the location of the device based upon the relation of the mobile device to three substantially proximal cellular towers, and (3) comparing the locations determined by the Maps and Phone applications to ascertain a malfunction in the GPS or cellular antenna systems arranged substantially within the mobile device. The application may initiate testing of one or more functions of the mobile device while the user of the mobile device is operating the application and the application is displayed on a screen of the mobile device; alternatively, the application may conduct testing discreetly while the user of the mobile device is engaging other applications or functions of the mobile device or not using the mobile device at all. The application preferably notifies the user of the mobile device that testing of the mobile device is being conducted.

Step S110, which includes testing a mobile device, functions to collect data that can be used to check the functionality of the mobile device. The testing of the mobile device preferably includes testing communication components S112, testing user interface components S114, testing device operational components S116, and/or testing any other suitable components. The tests preferably target particular components with each test, though the tests may alternatively be combined to test multiple components. The data collected from the tests is preferably a binary result representing if the component is "working" or "not working". The data may alternatively include more detailed data, such as degradation of a function of the mobile device. In a first example, if a screen is not fully functional, the results may indicate what portion of the screen is not functional. In a second example, a test may indicate the capacity of a battery arranged within the mobile device as compared to the capacity of that battery when new, such as by noting that the energy capacity of the battery installed in the device has decreased by twenty percent since new. The testing is preferably conducted immediately preceding enrollment in an insurance program, but the testing may alternatively have a waiting period. The testing may additionally include conducting extended background testing S118. The background testing preferably functions to test components in a variety of normal use situations, and may be used to classify the behavior of the user of the mobile device. For example, the application may track instances of large accelerations of the mobile device (or alternatively access data that includes instances of large accelerations of the mobile device), wherein such large accelerations could indicate that the user is prone to dropping the mobile device and thus the risk of insuring the mobile device for the user increases. Alternatively, the application may take note of the amount of time that the phone is located within an area with a known high rate of theft of mobile devices, which may increase the risk of insuring the mobile device. Testing may include any suitable combination of the described tests. The testing of a particular component may be explicit, wherein the application provides instructions and preferably guides the user through an interaction. The interactions are preferably designed like a puzzle, game, test question or any suitable format completed by the user. There may additionally be steps wherein the user lets the application complete background operations. The testing of any component may alternatively be a hidden test that is conducted without explicitly notifying the user that a particular component is being tested. For example, when testing the ability to make a phone call, the microphone and speaker may additionally be tested for functionality.

Step S112, which includes testing communication components, functions to evaluate the ability of the mobile device to communicate through available communication channels. The communication component tests during Step S112 preferably tests a cellular antenna, a Wi-Fi internet connection, GPS, Bluetooth, data link, and/or any other suitable communication components. Communication is preferably tested by establishing a connection to another device using the communication channel, and then transferring a message. The message is preferably automatically transferred and confirmed. The message may alternatively require user interaction to test the communication channel. Some of the tests may additionally require the user to complete tasks such as system configuration. For example, the user may be required to access a Wi-Fi network, turn off Wi-Fi, turn on Bluetooth, etc. Such system configuration tasks may be performed outside of the test app. In one variation, the Wi-Fi and/or cellular antenna may be tested by establishing a HTTP connection to a test server (any suitable internet protocol may be used), and the test server preferably transmits a specified message. The application on the mobile device preferably verifies that the expected message is received. The application may additionally send a message to the test server over the internet connection. As another variation, the cellular antenna may be tested by initiating a phone call to the phone number of the mobile device. An automated voice system preferably reads a message to the user, who inputs the message into a text field of the app. The user may additionally be required to repeat set phrases to the automated voice app, and user commands are then preferably confirmed. This variation has the additional benefit of combining testing of communication components with testing user interface components (i.e., speaker, microphone and proximity sensor). For location devices, the user may be required to enter their current address and that location information is compared to location information received by the GPS component. Cellular triangulation information may additionally be used to test the GPS and/or cellular antenna. In another variation, Bluetooth or other short-range communication protocols may be tested by connecting to a second device. A test program on a desktop computer or other computing device preferably sends and receives test communication messages. The data link port (e.g., a USB connection port) may additionally require a user to connect the mobile device to a computer running a test program. The test program then preferably verifies that communication can be achieved through the data link cable/connection.

Step S114, which includes testing user interface components, functions to evaluate the functionality of user input and feedback devices of the mobile device. The user interface component tests during Step S114 preferably tests a screen, speaker, headphones, microphone, camera, accelerometer, gyroscopes, compass, touch screen, buttons, haptic feedback devices, proximity sensors, or any suitable user interface component. The tests preferably target each user interface component. Many of the tests require a user to complete a task and if the task is not correctly completed, the tested component may be identified as being non-functional. The tests may have any suitable level of redundancy.

A screen is preferably tested by displaying various graphics on the screen. In one example, a series of tests displays information in different locations of the screen and requires the user to enter the displayed information. The touch screen may similarly be tested by requiring the user to trace a finger along a specified path whereby the touch sensing capabilities of the mobile device may be detected. Alternatively, while proceeding through the application, virtual buttons or user interface elements of the application may be positioned in various locations. In this variation, the touch screen and possibly the screen may be tested without alerting the user to the testing of the touch screen or screen.

Buttons, scroll balls, and any suitable analog input devices are preferably tested by requiring user activation of the inputs. For example, a QWERTY keyboard is preferably tested by requiring a user to type a pangram such as "The quick brown fox jumps over the lazy dog". Other buttons such as arrow, menu, volume, and/or other buttons may additionally require a user input to test. If a button cannot be triggered by the user, then the button is preferably identified as broken or non-functioning.

A speaker and/or headphone jack is preferably tested by playing a recording. The user preferably is required to identify the contents of the recording, such as a message or timing of sounds. A microphone is preferably tested by recording a set phrase spoken by the user. As an additional alternative, the speaker and microphone may perform a coordinated test, where the microphone records the sounds produced by the speaker. This alternative preferably removes the possibility of human error and allows more sophisticated audio tests to be performed such as testing the range of the speaker and microphone. The speaker and microphone preferably have a known sound response profile that can be used as reference for evaluating the test results.

A camera is preferably tested by taking a photo. The photo may be of any suitable object, but the photo may be of a standard object such as an image printed for the test or any suitable object.

An accelerometer, gyroscope, compass, and/or any suitable motion/orientation sensor is preferably tested by instructing the user to move the mobile device in particular ways such as shaking, tilting up, rotating, or any suitable motion. The sensor range and sensitivity is preferably evaluated by recording the sensor signals during the motions. One exemplary test of the compass is preferably conducted by instructing the user to rotate in a full circle while holding the mobile device outward. In this exemplary test, the compass sensor would preferably produce a sensor signal for substantially the whole range of cardinal directions.

Haptic feedback devices preferably include vibrational motors, piezoelectric vibrators and any suitable physical feedback device. A haptic feedback device is preferably tested by having a user provide feedback when the haptic feedback device is activated. For example, the user may be required to tap a button in response to a vibration. The haptic feedback device may alternatively be pulsed in a pattern that preferably tests different levels of activation. As an alternative, the haptic feedback device and a motion sensor such as an accelerometer or gyroscope preferably perform a cooperative test. The haptic feedback preferably generates expected levels of motion that are preferably detected by an accelerometer, gyroscope or any suitable motion sensor arranged substantially within the mobile device. This variation functions to automate the process of testing the haptic feedback device and motion sensor.

A proximity sensor, as is sometimes used to detect when a phone is held up next to the ear of a user, is preferably tested by instructing the user to hold the phone up to his or her ear. The proximity sensor may alternatively be tested in the background when the ability to make a phone call is tested (assuming the user places the phone to his or her ear during the call).

Step S116, which includes testing device operational components, functions to evaluate the functionality of basic hardware and software components of the mobile device. The component tests of Step S116 preferably test the operating system, battery, hard drive or memory, memory card reader, SIM card reader, processor, and/or any other system arranged on or within the mobile device. Step S116 may include checking model numbers or version numbers. The model number or version number of the mobile device can preferably be used to detect if the mobile device incorporates any replacement parts and/or modifications. Model numbers or version checks may additionally be used to determine the age of the phone. For example, tests for the operating system may detect if the phone has been "jailbroken" (i.e., manufacturer restrictions removed), if the SIM card has been unlocked (i.e., modified to accept any SIM), or if any suitable non-standard modification has been performed. Other components are preferably tested by performing basic operations such as reading and writing data to memory to test the hard drive/memory of the mobile device. Step S116 preferably includes recording battery health (capacity), number of charge cycles, and any other suitable information. The device component tests are preferably background tests, and occur automatically. In some cases, Step S116 may additionally include detecting the applications installed on the mobile device, the identification number of the mobile device, the version of the operating system operating on the mobile device, most recent use data of the mobile device, the date of first use of the mobile device, the cellular provider, the cellular plan usage, or any other information. This information can preferably be used when calculating the risk of insuring the mobile device. The information may alternatively be used to create a user profile. The user profile is preferably used to classify the type of user of the mobile device, such as if the user employs the mobile device for business, games, media, family, etc.

Step S118, which includes conducting extended background-testing, functions to perform tests over a long duration. The steps of S112, S114, and S116 may be performed in a single short session with the application (e.g., around one minute). Step S118 functions to perform longer duration tests. The application preferably operates in the background for an extended period of time such as a day or a week, which functions to collect data from the phone during normal operation. Various sensors preferably collect periodic data. For example GPS and accelerometer data is preferably collected. The data may be used to classify the user into particular behavioral pools. For example, the frequency of use of the phone may be detected based on movement, phone network usage, network usage, etc. As another example, from location and motion data, analysis could preferably indicate if the user uses the mobile device while running, travelling, or performing other suitable activities.

Step S120, which includes calculating risk of insuring the mobile device with results from the test, functions to determine an appropriate insurance policy or program enrollment rate. The operational state of the various components is preferably collectively considered when calculating risk. If all components pass, the risk is preferably low. If a component of the mobile device experienced a failure or had questionable/non-standard performance, then the risk is preferably higher. If most or all components failed, then the risk is preferably very high, possibly to the extent that the mobile device is no longer insurable. In one embodiment, the risk preferably determines the resell value of the mobile device, wherein the resale value is based upon the functionality of the mobile device and the degradation of function as compared to the mobile device when new. Calculating risk may additionally include factors like age of the mobile device, which may be determined in Step S116 or in any suitable fashion. Calculating risk may additionally include factoring in user profiles created during the testing. In another embodiment, the risk calculation preferably verifies that all required components and factors match a desired state. If the all the information passes, then the mobile device is preferably eligible for an insurance policy. The calculation of the risk of insuring the mobile device may be performed from within the application; in this example, the application incorporates a set of rules, a guideline, an algorithm, etc., to calculate risk based upon the functionality of the mobile device as determined by the application. Alternatively, the calculation of risk of insuring the mobile device may be performed substantially remote from the mobile device. For example, the application may transmit data pertaining to the functionality of the mobile device to a server arranged substantially remote from the mobile device, wherein risk is calculated on the server (or in the "cloud"). Data may be transmitted to the server piecemeal, such as after each test or series of tests, or as one lump data packet containing results of all tests performed. The application may then receive information regarding the risk of insuring the mobile device and thus determine an appropriate insurance policy based upon this information; alternatively, the application may simply receive information regarding an appropriate insurance policy based on the risk as determined substantially remote from the mobile device.

Step S130, which includes offering a protection policy, functions to complete the enrollment of the mobile device. Preferably, Step 130 includes offering an insurance policy for the mobile device. A protection policy corresponding to the device risk calculated in Step S120 is preferably presented and described within the app, and the user may complete the enrollment in and/or purchase of the protection policy from within the application. In this embodiment, the user preferably submits payment information (such as checking account direct billing information or credit card information) through the application, wherein the application transmits the payment information to a server arranged substantially remote from the mobile device and configured to manage protection policy accounts. The application preferably encrypts information, specifically payment information, to encryption standards such as the Data Encryption Standard (DES), Triple Data Encryption Standard (3-DES), or Advanced Encryption Standard (AES); the application may also use cryptographic protocols such as Diffie-Hellman key exchange, Wireless Transport Layer Security (WTLS), or any other suitable type of protocol to protect user information. In the embodiment in which test results are transmitted to a remote server, this data may also be encrypted. However, the application may also direct the user to a second application operating on the mobile device or a website in which the user may enroll in and submit payment for the protection policy. Alternatively, a reference number is preferably provided to the user (such as from within the application or emailed to an email address provided by the user when the application was installed on the mobile device), and the user may use this reference number later to complete the enrollment in and/or payment for the protection policy. Step S130 is preferably used to provide an insurance policy for the mobile device, but may alternatively be for a warranty, product registration, and/or any suitable mobile device enrollment. As an additional alternative, used-product pricing or other suitable mobile device evaluation may be offered.

The above method is preferably implemented in a computer-readable medium storing computer-readable instructions. The instructions are preferably executed by computer-executable components of a mobile device and other supporting devices such as a test server. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Figure 2:
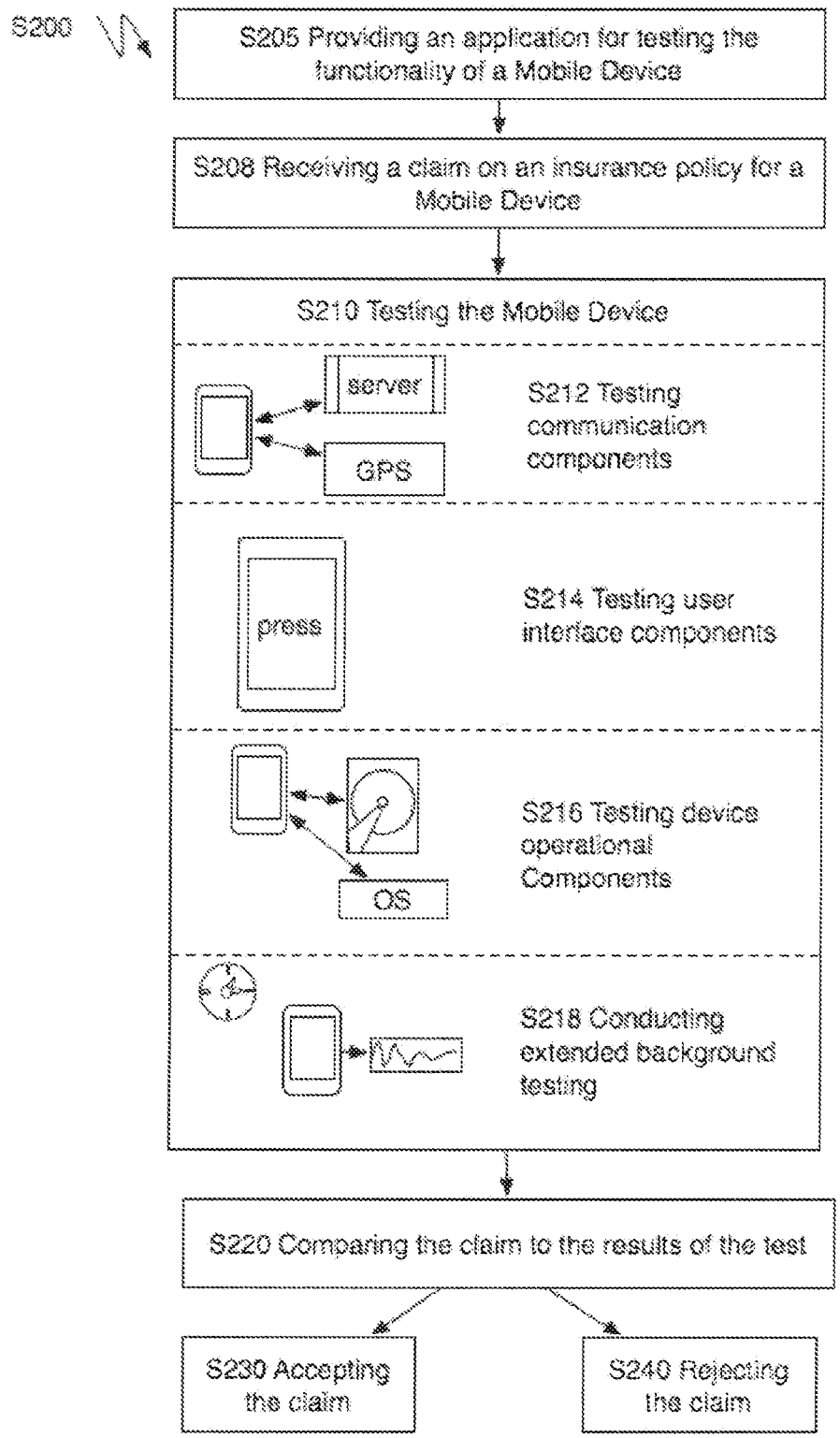
FIG. 2 is a flowchart representation of a method of a second preferred embodiment of the invention.

As shown in FIG. 2, a method of a second preferred embodiment for verifying a claim on a protection policy for a mobile device preferably includes: providing an application for testing the mobile device S205; receiving a claim on a protection policy 208; testing a mobile device Silo; comparing the claim to the results of the test; and accepting or rejecting the claim. The protection policy is preferably an insurance policy and provided to the user and/or owner of the mobile device as described above, but protection policy may be of any other type and produced by any other suitable method. The method of the second preferred embodiment functions to evaluate the operational state of the mobile device, compare it to a previous or expected state, and accept or reject a claim for damage to (or problem with) the mobile device. The method is preferably for smart phones but may alternatively be for mobile phones, personal data assistants (PDA), netbooks, tablet computers, electronic book readers, home entertainment devices, gaming devices, or any other suitable computing device. The method is preferably designed for evaluating a claim on an insurance policy for a mobile device, but may alternatively be for evaluating a claim on a warranty or any other suitable mobile device protection program evaluation.

Step S205, which includes providing an application for testing a mobile device, functions to provide a platform upon which to test at least one function of the mobile device. Preferably Step S205 is substantially similar to Step S105 of the first preferred embodiment, wherein the application of Step S205 is loaded onto the mobile device in a method similar to that of the application of Step S105. The application described in Step S205 may be the same application as that described in Step S105. Alternatively, the user of the mobile device may download the application of Step S205 only after downloading the application of Step S105 and enrolling in the insurance policy described in Step S130. Preferably, the user of the mobile device is enrolled in a protection policy for the mobile device before accessing the application of Step S205.

Step S208, which includes receiving a claim on the insurance policy for the mobile device, functions to identify potential damage to or a potential problem with the mobile device. Preferably, upon discovery of a potential issue with the mobile device, the owner and/or user of the mobile device submits the claim to the protection (i.e. insurance or warranty) company for processing. Preferably, the user accesses the application of Step S205 and selects a problem with the mobile device from a list of potential problems from within the application. Alternatively, the user may contact a customer service representative of the company providing the protection policy for the mobile phone and describe the problem; the user may also access a website and submit the claim to the insurance company therein; or the user may advise the company of the problem by any other method. If the claim is advised substantially remote from the mobile device, such as not from within the application of S205 installed on the mobile device, then a report of the potential problem is preferably transmitted to the application.

Step S210, which includes testing a mobile device, functions to collect data that can be used to check the functionality of the mobile device. Preferably, Step S210 of the second preferred embodiment functions substantially similar to Step S110 of the first preferred embodiment. As in S110, a plurality of functions of the mobile device may be tested in S210. If all functions or all primary functions (such as the ability to make and receive phone calls and to send and receive SMS messages) of the mobile device are tested in S210, the application may determine an problem(s) with the mobile device in addition to the problem related to the claim as indicated by the user of the mobile device; the application may inform the user of the additional problem(s). Alternatively, only one or only a subset of functions described in the claim may be tested in S210, which may reduce the amount of time required to test the mobile device and to verify the claim. If the application determines that the problem related to the claim (or an additional problem discovered by the application) is fixable by the user, the application preferably suggests a method by which the user may solve the problem. For example, if the user determines that the mobile device will not accept push notifications and reports this to the application as a problem or defect, and the application determines there is no defect with the mobile device but rather the settings of the mobile device are not suited to a need or desire of the user, the application may suggest that the user change the notification settings of the device to alleviate the problem.

Step S220, which includes comparing the claim to the results of the test, functions to verify the claim. The application collects data regarding the state of the mobile device, specifically the functionality of the mobile device, in order to identify faulty or fraudulent claims. Preferably, the application performs the comparison while operating on the mobile device. In this example, the application may store data regarding the results of the tests locally on the mobile device and then determine the merit of the claim based upon this data. Alternatively, the application may transmit data pertaining to the functionality of the mobile device to a server arranged substantially remote from the mobile device, wherein the comparison of the claim and the state of the mobile device is performed on the server. Data may be transmitted to the server piecemeal, such as after each test or series of tests, or as one lump data packet containing results of several or all tests performed.

Steps S230 and S240, which includes accepting or rejecting the claim, function to inform the owner and/or user of the mobile device of the status of the claim. Preferably, the application performs the comparison of the claim to the functionality of the mobile device and provides the result of the comparison to the user through the application within a substantially short period of time after the claim was first received by the application (such as within one minute). In this variation, the application may inform the user that the claim was accepted (when the claim matches the functionality of the mobile device as tested) and allow the user to select a method of repairing or replacing the mobile device. The application may also inform the user that the claim was rejected (such as when the claim does not match the functionality of the mobile device as tested or the defect is not covered by the insurance policy). Alternatively, the application may provide a reference number to the user, wherein the user may later use the reference number to check the status of the claim, such as on the internet in a web browser or over the phone with a representative of the company providing the insurance policy. However, the status of the claim may be determined and presented by any other method or methods.

As a person skilled in the art will recognize from the previous detailed description and from the figures and claims, modifications and changes can be made to the preferred embodiments of the invention without departing from the scope of this invention defined in the following claims.

We claim:

1. A method for offering a protection service for a device, the method comprising:
providing an application to the device, wherein the application is configured to cause the device to test a plurality of functional aspects of the device and to generate test results, wherein the application is configured to cause the device to send the test results to a server;
receiving, by the server, the test results from the device;
calculating, by the server, a risk associated with providing one or more offers for protecting the device based on the test results;
determining, by the server, whether to provide an offer relating to protection of the device, wherein determining whether to provide the offer comprises determining whether the calculated risk indicates that the device is insurable; and
providing, by the server, the offer based on a determination that the offer is to be provided,
wherein the application is configured to cause the device to perform testing to determine a typical operational use or condition of the device, and wherein the test results comprise one or more test results that result from the application conducting a test of at least one function of the device through the application or an analysis of data collected from the device by the application to determine the typical operational use or condition of the device.

2. The method of claim 1, wherein the offer comprises one or more of an offer for a protection policy, an offer to replace the device, or an offer to repair the device.

3. The method of claim 1, wherein the test results comprise one or more of a test result for a communication component of the device or a test result for a user interface component of the device.

4. The method of claim 1, wherein the application is configured to track accelerations of the device, and wherein the test results comprise one or more test results related to the accelerations of the device.

5. The method of claim 1, wherein providing the offer comprises sending the offer to the application to cause the application to present the offer to a user of the device.

6. The method of claim 1, wherein determining whether to provide the offer comprises determining a resell value of the device based on the test results.

7. The method of claim 1, wherein the testing comprises background testing to determine a typical operational use of the device.

8. A system comprising:
one or more processors configured to communicate with an application on a device, wherein the application is configured to cause the device to test a plurality of functional aspects of the device and to generate test results, wherein the application is configured to cause the device to send the test results to a server; and a computer-readable medium storing instructions that when executed cause the one or more processors to perform operations comprising:

receiving the test results from the device;

calculating a risk associated with providing one or more offers for the device based on the test results;

determining whether to provide an offer relating to the device based on the risk; and providing, by the server, the offer based on a determination that the offer is to be provided, wherein the application is configured to cause the device to perform testing to determine a typical operational use or condition of the device, and wherein the test results comprise one or more test results that result from the application conducting a test of at least one function of the device through the application or an analysis of data collected from the device by the application to determine the typical operational use or condition of the device.

9. The system of claim 8, wherein the offer comprises one or more of an offer for a protection policy, an offer to replace the device, or an offer to repair the device.

10. The system of claim 8, wherein the test results comprise one or more of a test result for a communication component of the device or a test result for a user interface component of the device.

11. The system of claim 8, wherein the application is configured to track accelerations of the device, and wherein the test results comprise one or more test results related to the accelerations of the device.

12. The system of claim 8, wherein providing the offer comprises sending the offer to the application to cause the application to present the offer to a user of the device.

13. The system of claim 8, wherein determining whether to provide the offer comprises determining a resell value of the device based on the test results.

14. The system of claim 8, wherein the testing comprises background testing to determine a typical operational use of the device.

\* \* \* \* \*